US012632838B2

(12) United States Patent (10) Patent No.: US 12,632,838 B2
Metzger et al. (45) Date of Patent: May 19, 2026

(54) DIGITAL DATA OBJECT SYSTEM

(71) Applicant: Lotto.com Inc., Jersey City, NJ (US)

(72) Inventors: Thomas Metzger, Millbrook, NY (US);
Arthur Mirzoian, Bayonne, NJ (US)

(73) Assignee: Lotto.com Inc., Jersey City, NJ (US)

( * ) Notice: Subject to any disclaimer, the term of this
patent is extended or adjusted under 35
U.S.C. 154(b) by 209 days.

(21) Appl. No.: 18/045,035

(22) Filed: Oct. 7, 2022

(65) Prior Publication Data

US 2023/0259897 A1 Aug. 17, 2023

Related U.S. Application Data

(60) Provisional application No. 63/268,171, filed on Feb.
17, 2022.

(51) Int. Cl.
G06Q 20/04 (2012.01)
G06Q 20/38 (2012.01)
(52) U.S. Cl.
CPC ......... G06Q 20/047 (2020.05); G06Q 20/385
(2013.01)
(58) Field of Classification Search
CPC ........................... G06Q 20/047; G06Q 20/385

USPC ........................................ 705/24; 463/17, 25
See application file for complete search history.

(56) References Cited

U.S. PATENT DOCUMENTS

| | | | | |
|---|---|---|---|---|
| 2011/0070945 | A1* | 3/2011 | Walker | G07F 17/329 463/25 |
| 2013/0065667 | A1* | 3/2013 | Nelson | G07F 17/3211 463/25 |
| 2017/0026321 | A1* | 1/2017 | Ciavatta | H04L 51/04 |
| 2020/0265676 | A1* | 8/2020 | Higgins | G07F 17/3248 |

* cited by examiner

*Primary Examiner* — Luna Champagne
(74) *Attorney, Agent, or Firm* — DLA Piper LLP (US)

(57) ABSTRACT

A computing system receives a request to create a digital
data object from a user device of a user. The request includes
user data for the digital data object. The computing system
generates the digital data object based on one or more
parameters of the user data. The computing system generates
a quick response (QR) code associated with the digital data
object. The QR code uniquely identifies the digital data
object. The computing system causes a physical copy of the
digital data object to be printed by causing display of the QR
code on an output device, and causing scanning of the QR
code. The scanning of the QR code causes a printer to print
the physical copy of the digital data object.

14 Claims, 5 Drawing Sheets

100

300

DIGITAL DATA OBJECT SYSTEM

CROSS-REFERENCE TO RELATED APPLICATIONS

This application claims priority to U.S. Provisional Application Ser. No. 63/268,171, filed Feb. 17, 2022, which is hereby incorporated by reference in its entirety.

FIELD OF THE DISCLOSURE

Embodiments disclosed herein generally related to a system to generate digital data object and physical copies of the digital data object.

BACKGROUND

Online lottery ticket sales are a relatively nascent option for players in the United States. In the UK, by way of comparison, the digital channel represents over 40% of all National Lottery sales.

SUMMARY

In some embodiments, a method is disclosed herein. A computing system receives a request to create a digital data object from a user device of a user. The request includes user data for the digital data object. The computing system generates the digital data object based on one or more parameters of the user data. The computing system generates a quick response (QR) code associated with the digital data object. The QR code uniquely identifies the digital data object. The computing system causes a physical copy of the digital data object to be printed by causing display of the QR code on an output device, and causing scanning of the QR code. The scanning of the QR code causes a printer to print the physical copy of the digital data object.

In some embodiments, a system is disclosed herein. The system includes a processor and a memory. The memory has programming instructions stored thereon, which, when executed by the processor, causes the system to perform operations. The operations include receiving a request to create a digital data object from a user device of a user. The request includes user data for the digital data object. The operations further include generating the digital data object based on one or more parameters of the user data. The operations further include generating a quick response (QR) code associated with the digital data object. The QR code uniquely identifies the digital data object. The operations further include causing a physical copy of the digital data object to be printed by causing display of the QR code on an output device, and causing scanning of the QR code. The scanning of the QR code causes a printer to print the physical copy of the digital data object.

In some embodiments, a non-transitory computer readable medium is disclosed herein. The non-transitory computer readable medium includes one or more sequences of instructions, which, when executed by one or more processors, causes a computing system to perform operations. The operations include receiving, by the computing system, a request to create a digital data object from a user device of a user. The request includes user data for the digital data object. The operations further include generating, by the computing system, the digital data object based on one or more parameters of the user data. The operations further include generating, by the computing system, a quick response (QR) code associated with the digital data object.

The QR code uniquely identifies the digital data object. The operations further include causing, by the computing system, a physical copy of the digital data object to be printed by causing display of the QR code on an output device, and causing scanning of the QR code. The scanning of the QR code causes a printer to print the physical copy of the digital data object.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein generally relate to a system and method for generating a digital data object and a corresponding physical printed copy of the digital data object. With the ever increasing reliance on computers and mobile devices, companies have turned to digital platforms for delivering their offerings to end users. While most companies are able to perform this migration seamlessly, for other companies, such as those involved in state lotteries, the adoption of a digital platform is not as trivial. These companies typically have to satisfy the various guidelines and laws of their states in order to provide end users with some form of a digital or mobile experience. Conventionally, entities involved in the sale or delivery of state lottery tickets are limited to only allowing end users to create a "would be" lottery ticket on their mobile devices. This digital creation is not valid until the user visits a state approved facility to print a physical copy of the digital ticket. As those skilled in the art understand, this places a burden on the user to identify a state approved facility and physically navigate to the state approved facility to participate in the game, thus reducing the number of interested parties participating in the game.

One or more techniques described herein eliminates this burden on potential participants by providing a means to satisfy the guidelines of the state. For example, one or more techniques described herein utilize digital data objects and quick response (QR) codes corresponding to the digital data objects to automatically print physical copies of the underlying digital data objects, thus increasing participation in a game.

The term "user" as used herein includes, for example, a person or entity that owns a computing device or wireless device; a person or entity that operates or utilizes a computing device or wireless device; or a person or entity that is otherwise associated with a computing device or wireless device. It is contemplated that the term "user" is not intended to be limiting and may include various examples beyond those described.

Figure 1:
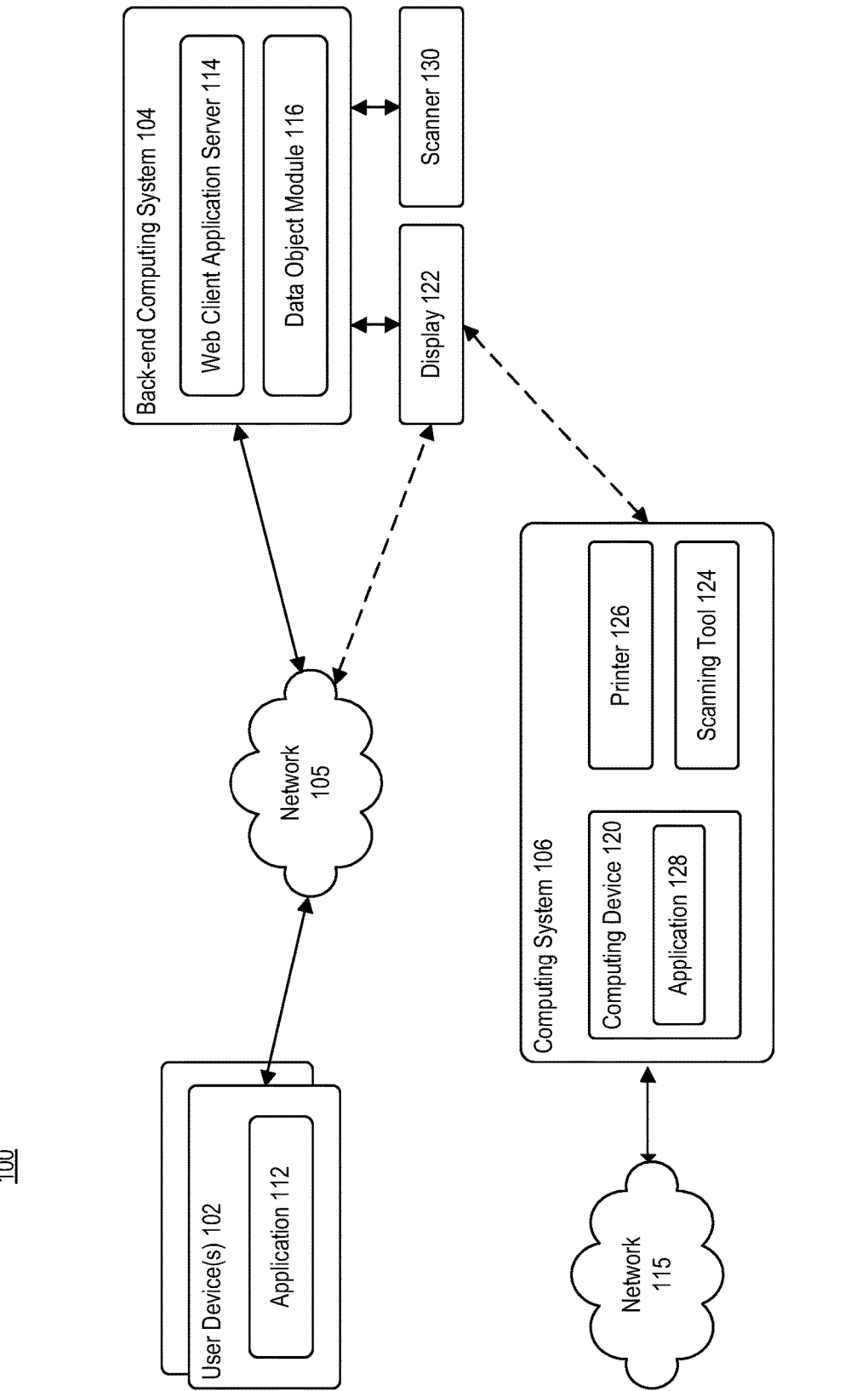
FIG. 1 is a block diagram illustrating a computing environment, according to one exemplary embodiment.

FIG. 1 is a block diagram illustrating computing environment 100, according to one embodiment. Computing environment 100 may include at least one or more user devices 102, a back-end computing system 104, and computing system 106. In some embodiments, one or more user devices 102 and back-end computing system 104 may communicate via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be the Internet, a private data network, virtual private network using a public network and/or other suitable connection(s) that enables components in computing environment 100 to send and receive information between the components of computing environment 100.

User device 102 may be operated by a user. In some embodiments, user device 102 may be operated by a user seeking to purchase a lottery ticket from back-end computing system 104. User device 102 may be representative of a mobile device, a tablet, a desktop computer, or any computing system having the capabilities described herein. User device 102 may include at least application 112. Application 112 may be representative of an application associated with back-end computing system 104. In some embodiments, application 112 may be a standalone application associated with back-end computing system 104. In some embodiments, application 112 may be representative of a web-browser configured to communicate with back-end computing system 104. In some embodiments, user device 102 may communicate over network 105 to request a webpage, for example, from web client application server 114 of back-end computing system 104. For example, user device 102 may be configured to execute application 112 to participate in a game (e.g., place an order for a lottery ticket with their selected numbers and/or add-ons). In some embodiments, an add-on may refer to an optional modifier that allows players to spend money to amplify certain prizes in a given game. The content that is displayed to admin device 102 may be transmitted from web client application server 114 to user device 102, and subsequently processed by application 112 for display through a graphical user interface (GUI) of user device 102.

Back-end computing system 104 may include web client application server 114 and data object module 116. Data object module 116 may be comprised of one or more software modules. The one or more software modules are collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Data object module 116 may be configured to facilitate the generation of digital data objects (e.g., electronic payslips) and the printing of physical copies of each corresponding digital data object (e.g., physical lottery tickets based on the electronic payslips). For example, in operation, data object module 116 may be configured to receive user data via application 112. In some embodiments, the user data may define the user's participation in a given game. For example, the user data may define the game type (e.g., PowerBall, Pick4, Pick5, and the like) and information pertaining to the user's selected entries for the game type (e.g., lottery numbers). Based on the user data, data object module 116 may be configured to generate a digital data object. In some embodiments, the digital data object may correspond to an electronic payslip associated with the user data. For example, each digital data object may be representative of a string that includes one or more of the state market identifier, game type identifier, and selected numbers. Using a more specific example, an electronic data object may include:

$$WPD01MYS010203040506$$

where W is a static variable representing a wager event, P represents the type of game (e.g., PowerBall), D is a static variable designating the number of the draw, 01 indicates a number of tickets for the next range of draws, M is a static variable representing whether PowerPlay is initiated, Y is a variable following M that indicates a value for the static variable M (i.e., yes for PowerPlay), and S designates the start of the payslip numbers. As shown, the foregoing electronic data object will generate a physical payslip for a 1-line PowerBall ticket with PowerPlay having the numbers 01, 02, 03, 04, 05, and bonus ball 06.

Once the digital data object is generated, data object module 116 may generate a valid uniform resource identifier (URI) corresponding to the digital data object. The URI may uniquely identify the digital data object that was created based on the user data. Using the URI, data object module 116 may generate a quick response (QR) code. The QR code may allow for quick access to the underlying digital data object.

Once generated, data object module 116 may cause a display of the QR code. In some embodiments, data object module 116 cause display of the QR code via display 122. In some embodiments, display 122 may be associated with back-end computing system 104. In some embodiments, display 122 may be associated with another computing device remote from back-end computing system 104. For example, data object module 116 may cause display of the QR code by transmitting the QR code to a display of an external computing system.

Computing system 106 may be external to back-end computing system 104. For example, computing system 106 may be connected to private network 115. In some embodiments, computing system 106 may be managed by a state run entity or organization. For example, computing system 106 may be representative of a state approved vendor terminal for lottery ticket production.

In some embodiments, back-end computing system 104 may further be associated with a scanner 130. Scanner 130 may be configured to receive, as input, the plurality of physical copies of the corresponding digital data objects printed by printer 126.

Computing system 106 may include one or more of a computing device 120, scanning tool 124, and/or printer 126. Computing device 120 may include an application 128 executing thereon. Application 128 may be representative of an application for executing lottery terminal software associated with an organization or entity running a state's lottery.

In some embodiments, scanning tool 124 may be positioned to automatically scan the QR codes that are presented via display 122. For example, scanning tool 124 may be representative of a QR code scanning tool that may be positioned towards display 122. In operation, as display 122 displays each QR code, scanning tool 124 may be configured to scan the displayed QR code. In this manner, scanning tool 124 may scan hundreds of QR codes very quickly compared to the traditional approach of requiring users to visit a state approved vendor terminal.

Printer 126 may be configured to print a physical copy of the digital data object generated by data object module 116. In this manner, computing system 106 may work in conjunction with data object module 116 to replicate the process performed by a user. For example, as compared to conventional systems, in which the user must navigate to a state approved vendor terminal to scan and print a physical version of their electronic payslip that was generated using a mobile application (e.g., application 112), the present system removes the burden from the consumer and facilitates the physical printing process without causing the user to perform any extra steps, such as finding a state approved terminal to print a physical copy of the digital data object.

In some embodiments, data object module 116 may perform one or more optical character recognition (OCR) techniques to the plurality of images to determine whether there is a corresponding match to each digital data object. The one or more OCR techniques may be employed to confirm that each digital data object has a corresponding printed physical copy and that the corresponding printed physical copy accurately captures the data of the underlying digital data object. For example, in operation, an operations associate may choose the number of digital data objects to be printed in a batch prior to processing. Each digital data object in the batch may be displayed as a QR code in front of scanning tool 124, which may trigger the printing of the physical copy of the digital data object. The physical copy of the digital data object may pass through a sensor that sends a signal to back-end computing system 104 to move on to the next digital data object in the batch. Once the batch is completed, an operator may take the physical copies of the digital data objects and may feed them through scanner 130 to scan the front and back of each physical copy. Back-end computing system 104 may perform OCR on the image scans using a library of characters to match each digital data object to the scans.

Following confirmation that the printed physical copy of the digital data object is correct, data object module 116 may provide the user with a confirmation email. The confirmation email may include a scanned image of the printed physical copy of the digital data object.

Figure 2:
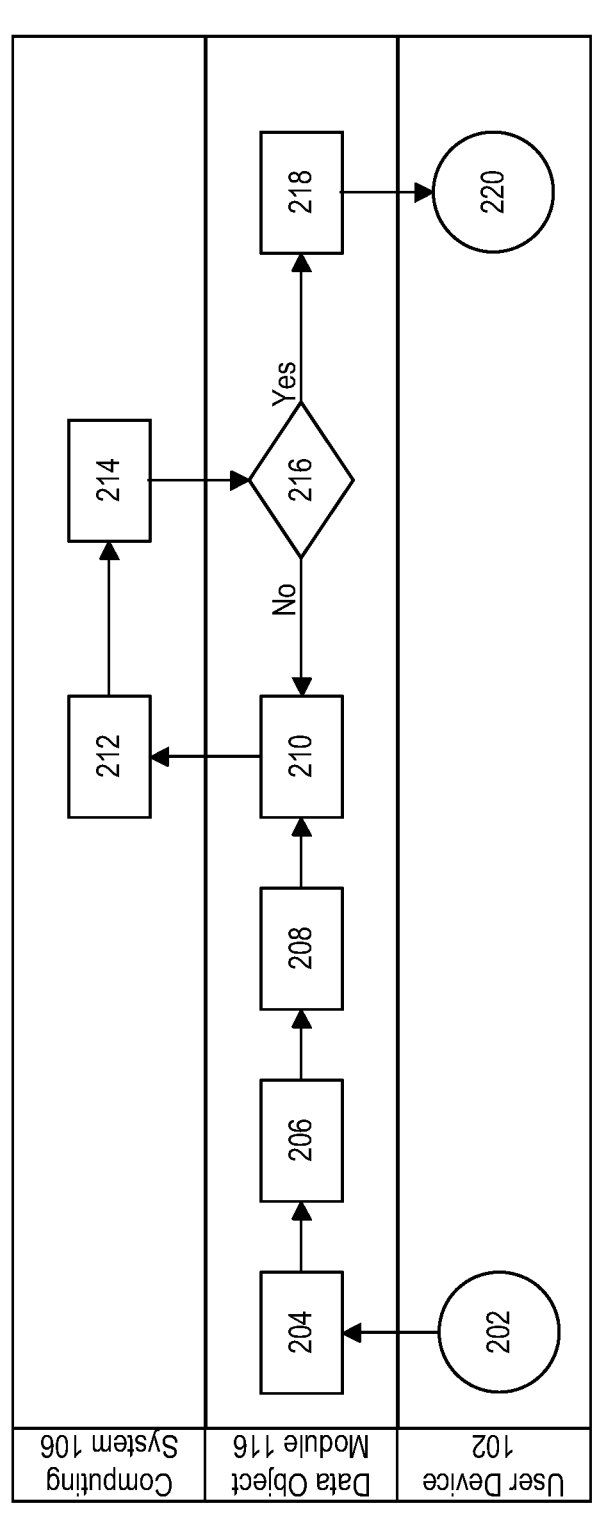
FIG. 2 is a block diagram illustrating an exemplary workflow 200, according to example embodiments.

FIG. 2 is a block diagram illustrating an exemplary workflow 200, according to example embodiments.

As shown, workflow 200 may begin at step 202. At step 202, a user of user device 102 may provide user data to back-end computing system 104. For example, a user of user device 102 may access application 112 to generate user data for generating a digital data object. In some embodiments, the user data may include, but is not limited to, a type of game the user wishes to play. In some embodiments, the user data may further include the numbers the user wishes to play in the selected game. Using a specific example, user data may include an indication that the user would like to participate in a Pick 3, bet type straight, along with any three numbers between 0 and 9 the user wishes to play: 01, 02, 03.

At step 204, data object module 116 may receive a call to create a digital data object based on the user data. For example, data object module 116 may receive an indication from application 112 that the user would like to create a digital data object based on the user data.

At step 206, data object module 116 may generate the digital data object based on the user data. In some embodiments, the digital data object may be representative of an object or token for the user to participate in the selected game in the user data. In some embodiments, the digital data object may be representative of a digital payslip that includes a string having a combination of values and static variables. For example, the string may indicate the type of game the user is participating in and the numbers the user is playing in the game.

At step 208, data object module 116 may generate a QR code corresponding to the digital data object. For example, data object module 116 may generate a URI that uniquely identifies the digital data object. Based on the URI, data object module 116 may generate the QR code that uniquely identifies the digital data object.

At step 210, data object module 116 may cause display of the QR code. In some embodiments, data object module 116 may cause display of the QR code via display 122.

At step 212, computing system 106 may scan the displayed QR code. For example, scanning tool 124 associated with computing system 106 may scan the QR code as it is displayed. At step 214, responsive to the scanning of the displayed QR code, computing device 120 may cause printer 126 to print a physical copy of the digital data object. For example, in response to scanning the displayed QR code, computing device 120 may receive the digital data object based on the underlying URI in the QR code.

At step 216, data object module 116 may determine whether the physical copy of the digital data object was printed properly. For example, a user may scan the physical copy of the digital data object using scanner 130. Data object module 116 may receive a scanned image of the physical copy of the digital data object from scanner 130. Data object module 116 may perform one or more OCR techniques to the scanned image to ensure that the physical copy of the digital data object is accurate.

If at step 216, data object module 116 determines that the physical copy of the digital data object was not printed properly, then workflow 200 may revert to step 210 to restart the scanning and printing processes. If, however, at step 216, data object module 116 determines that the physical copy of the digital data object was printed properly, then workflow 200 may proceed to step 218.

At step 218, data object module 116 may generate and send a notification to the user of user device 102. The notification may confirm to the user that the user has been entered into the game. In other words, the notification may confirm that the user now has a valid data object for the indicated game.

At step 220, user device 102 may receive the notification from data object module 116.

Figure 3:
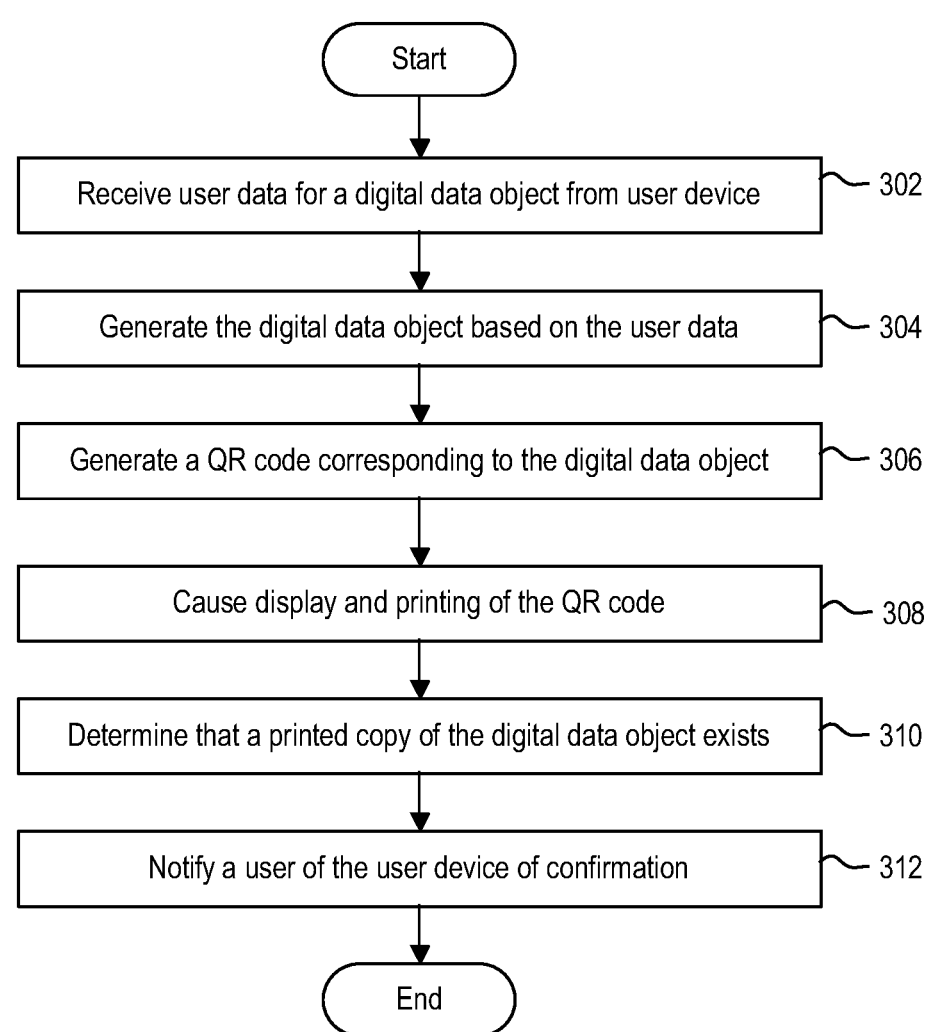
FIG. 3 is a flow diagram illustrating a method 300 of executing a workflow, according to example embodiments.

FIG. 3 is a flow diagram illustrating a method 300 of executing a workflow, according to example embodiments. Method 300 may begin at step 302.

At step 302, back-end computing system 104 may receive user data for a digital object from user device 102. In some embodiments, the user data may include, but is not limited to, a type of game the user wishes to play. In some embodiments, the user data may further include the numbers the user wishes to play in the selected game. Using a specific example, user data may include an indication that the user would like to participate in a Pick 3, along with the numbers the user wishes to play: 01, 02, 03.

At step 304, back-end computing system 104 may generate the digital data object. For example, data object module 116 may generate the digital data object based on the user data. In some embodiments, the digital data object may be representative of an object or token for the user to participate in the selected game in the user data. In some embodiments, the digital data object may be representative of a digital payslip that includes a string having a combination of values and static variables. For example, the string may indicate the type of game the user is participating in and the numbers the user is playing in the game.

At step 306, back-end computing system 104 may generate a QR code associated with the digital data object. For example, data object module 116 may generate a URI that uniquely identifies the digital data object. Based on the URI, data object module 116 may generate the QR code that uniquely identifies the digital data object.

At step 308, back-end computing system 104 may cause a physical copy of the digital data object to be printed. For example, data object module 116 may cause the QR code to be displayed via a display device. In some embodiments, data object module 116 may cause the QR code to be displayed via display 122. Once displayed, data object module 116 may cause scanning tool 124 to scan the displayed QR code. Scanning the displayed QR code may allow for retrieval of the corresponding data object. Once retrieved, computing system 106 may print a physical copy of the digital data object via printer 126.

At step 310, back-end computing system 104 may determine that the printed copy of the digital data object is correct. For example, data object module 116 may receive from scanner 130 a scanned image of the printed physical copy of the digital data object. Data object module 116 may perform one or more OCR techniques to the scanned image to determine whether the printed physical copy accurately conveys the details of the corresponding digital data object.

At step 312, back-end computing system 104 may notify a user of user device 102 that the digital data object is valid. For example, data object module 116 may notify the user of user device 102 that the digital data object has been created and that the user has been entered into the selected game. The customer can then view the scanned images related to their order using user device 102 as proof they are entered into a drawing or contest.

Figure 4:
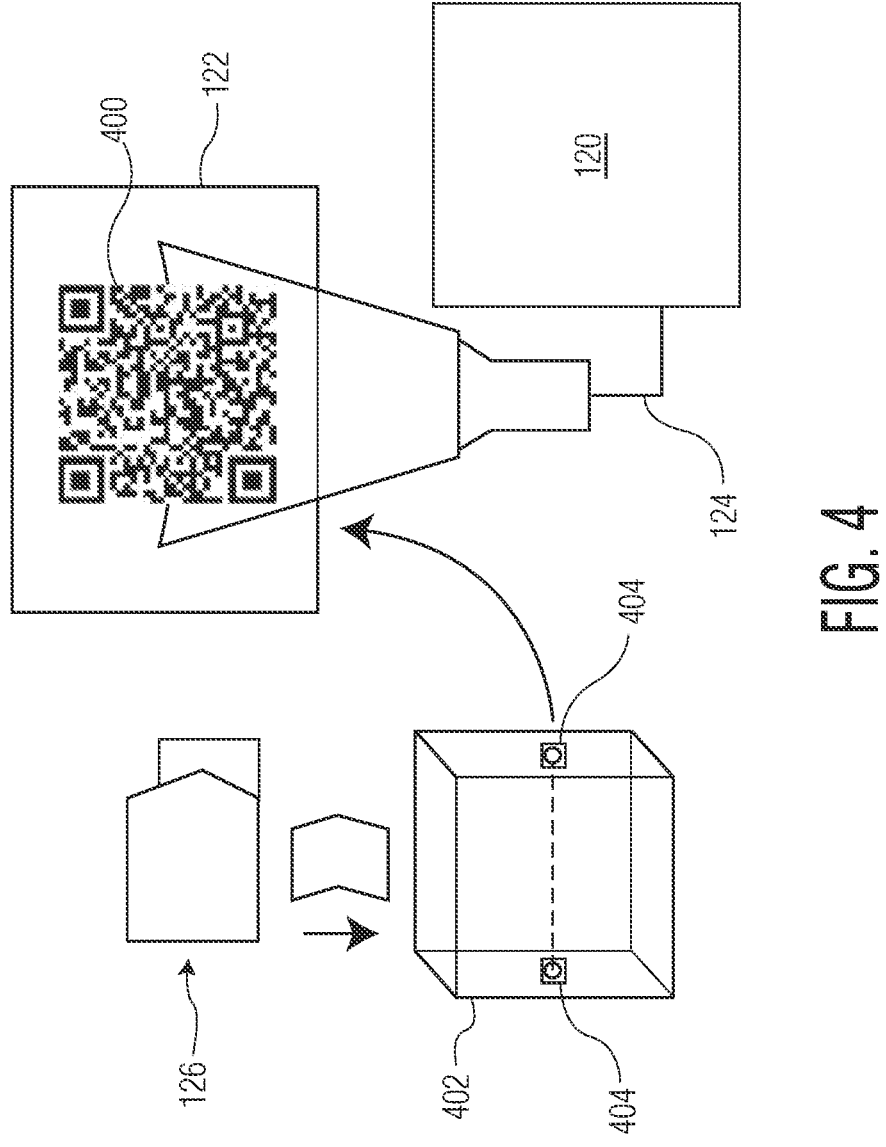
FIG. 4 is a block diagram illustrating components of the computing environment of FIG. 1, according to example embodiments.

FIG. 4 is a block diagram illustrating components of computing environment 100, according to example embodiments. As shown, computing system 106 includes computing device 120, a scanning tool 124, printer 126, and break beam chute 402. In some embodiments, scanning tool 124 may be physically coupled to computing device 120. In some embodiments, scanning tool 124 may be wirelessly coupled to computing device 120. Scanning tool 124 may be positioned in a manner such that scanning tool 124 continuously scans display 122. For example, as shown, scanning tool 124 may scan QR code 400 displayed via display 122. Once scanned, printer 126 may print a physical copy of the digital data object. In some embodiments, the physical copy of the digital data object may drop into break beam chute 402. Break beam chute 402 may be configured to collect or aggregate the physical copies of the digital data object. As shown, in some embodiments, break beam chute 402 may include one or more sensors 404. One or more sensors 404 may send a signal when the physical copy of the digital data object is printed and motion of the physical copy of the digital data object is detected within break beam chute 402. For example, another QR code may not be displayed and/or printed until one or more sensors 404 determine that a physical copy of the current QR code has been printed.

Figures 5A, 5B:
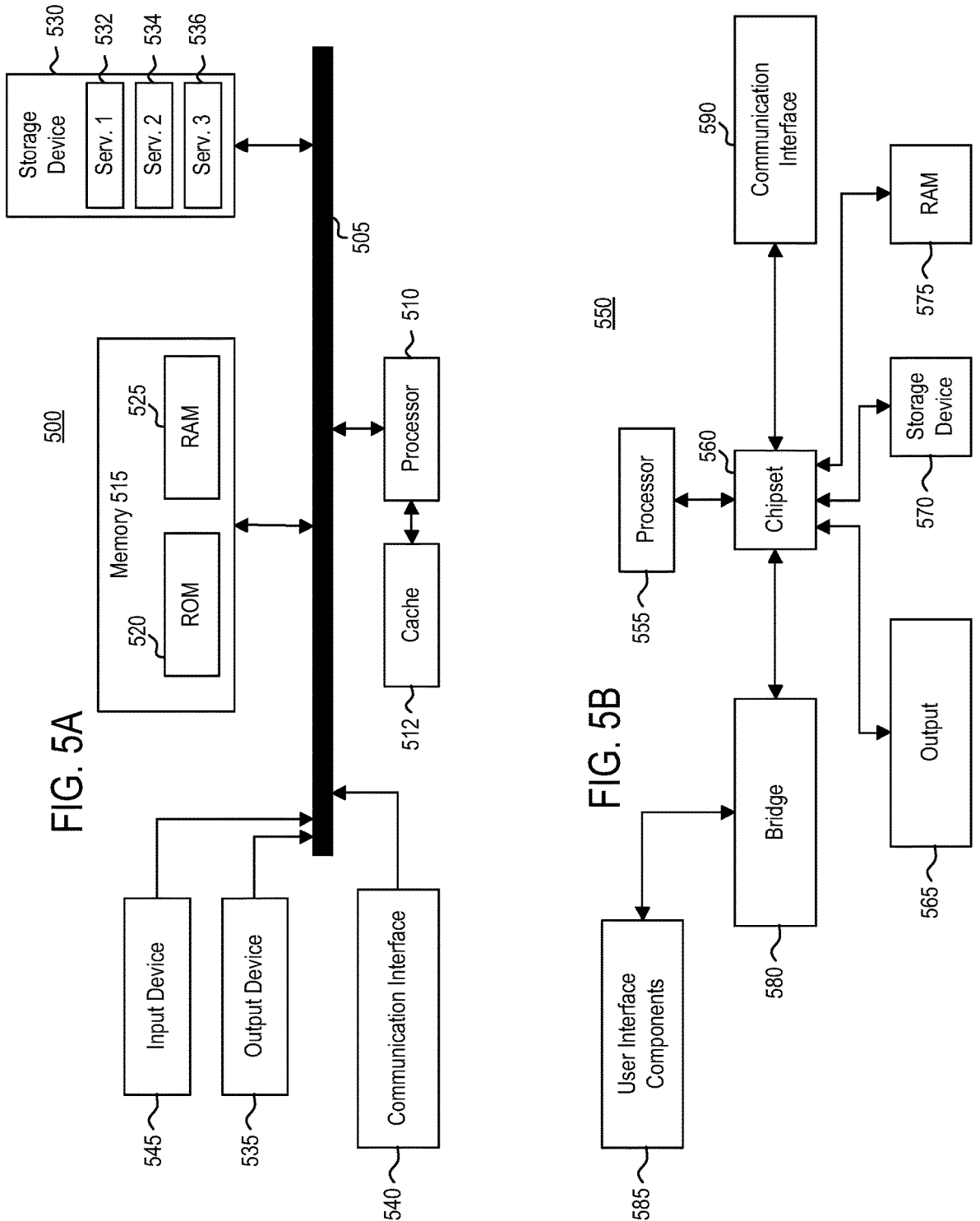
FIG. 5A illustrates a system bus computing system architecture, according to example embodiments.
FIG. 5B illustrates a computer system having a chipset architecture, according to example embodiments.

FIG. 5A illustrates an architecture of system bus computing system 500, according to example embodiments. One or more components of system 500 may be in electrical communication with each other using a bus 505. System 500 may include a processor (e.g., one or more CPUs, GPUs or other types of processors) 510 and a system bus 505 that couples various system components including the system memory 515, such as read only memory (ROM) 520 and random access memory (RAM) 525, to processor 510. System 500 can include a cache of high-speed memory connected directly with, in close proximity to, or integrated as part of processor 510. System 500 can copy data from memory 515 and/or storage device 530 to cache 512 for quick access by processor 510. In this way, cache 512 may provide a performance boost that avoids processor 510 delays while waiting for data. These and other modules can control or be configured to control processor 510 to perform various actions. Other system memory 515 may be available for use as well. Memory 515 may include multiple different types of memory with different performance characteristics. Processor 510 may be representative of a single processor or multiple processors. Processor 510 can include one or more of a general purpose processor or a hardware module or software module, such as service 1 532, service 2 534, and service 5 536 stored in storage device 530, configured to control processor 510, as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the system 500, an input device 545 can be any number of input mechanisms, such as a microphone for speech, a touch-sensitive screen for gesture or graphical input, keyboard, mouse, motion input, speech and so forth. An output device 535 (e.g., a display) can also be one or more of a number of output mechanisms known to those of skill in the art. In some instances, multimodal systems can enable a user to provide multiple types of input to communicate with system 500. Communication interface 540 can generally govern and manage the user input and system output. There is no restriction on operating on any particular hardware arrangement and therefore the basic features here may easily be substituted for improved hardware or firmware arrangements as they are developed.

Storage device 530 may be a non-volatile memory and can be a hard disk or other type of computer readable media that can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include services 532, 534, and 536 for controlling the processor 510. Other hardware or software modules are contemplated. Storage device 530 can be connected to system bus 505. In one aspect, a hardware module that performs a particular function can include the software component stored in a computer-readable medium in connection with the necessary hardware components, such as processor 510, bus 505, output device 535 (e.g., a display), and so forth, to carry out the function.

FIG. 5B illustrates a computer system 550 having a chipset architecture, according to example embodiments. Computer system 550 may be an example of computer hardware, software, and firmware that can be used to implement the disclosed technology. System 550 can include one or more processors 555, representative of any number of physically and/or logically distinct resources capable of executing software, firmware, and hardware configured to perform identified computations. One or more processors 555 can communicate with a chipset 560 that can control input to and output from one or more processors 555. In this example, chipset 560 outputs information to output 565, such as a display, and can read and write information to storage device 570, which can include magnetic media, and solid-state media, for example. Chipset 560 can also read data from and write data to storage device 575 (e.g., RAM). A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 555 analyzing data stored in storage device 570 or 575. Further, the machine can receive inputs from a user through user interface components 585 and execute appropriate functions, such as browsing functions by interpreting these inputs using one or more processors 555.

It can be appreciated that example systems 500 and 550 can have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:

receiving, by a computing system, a request to create a digital data object from a user device of a user, the request comprising user data for the digital data object;

generating, by the computing system, the digital data object based on one or more parameters of the user data;

generating, by the computing system, a quick response (QR) code associated with the digital data object, wherein the QR code uniquely identifies the digital data object; and responsive to generating the QR code, activating, by the computing system, the digital data object for participation into a game by:

causing, by the computing system, display of the QR code on an output device, causing, by the computing system, scanning of the QR code, wherein scanning the QR code causes a printer to print a physical copy of the digital data object, receiving, by the computing system, a scanned image of the physical copy of the digital data object, performing, by the computing system, optical character recognition techniques to the scanned image, comparing, by the computing system, the scanned image of the physical copy of the digital data object to data associated with the digital data object to confirm that the physical copy of the digital data object accurately captures the data of the digital data object, based on the comparing, determining, by the computing system, that the physical copy of the digital data object is accurate, and responsive to determining that the physical copy of the digital data object is accurate, activating, by the computing system, the digital data object, wherein activating the digital data object is a precondition to the user being entered into a game associated with the digital data object, and notifying, by the computing system, the user that the physical copy of the digital data object has been issued, wherein the notifying confirms to the user that the digital data object is valid and that the user has been entered into a game using the digital data object.

2. The method of claim 1, wherein the digital data object is an electronic payslip for a lottery game and wherein the physical copy of the digital data object is a printed version of the electronic payslip.

3. The method of claim 1, wherein generating, by the computing system, the QR code associated with the digital data object comprises:

generating a uniform resource identifier that uniquely identifies the digital data object; and based on the uniform resource identifier, generating the QR code associated with the digital data object.

4. The method of claim 1, wherein the digital data object is a string comprising a plurality of static variables and a plurality of values.

5. The method of claim 1, wherein causing the scanning of the QR code comprises:

causing, by the computing system, a remote scanning device to scan the QR code displayed on the output device.

6. A system, comprising:

a processor; and a memory comprising one or more sequences of instructions, which, when executed by the processor, causes the system to perform operations comprising:

receiving a request to create a digital data object from a user device of a user, the request comprising user data for the digital data object;

generating the digital data object based on one or more parameters of the user data;

generating a quick response (QR) code associated with the digital data object, wherein the QR code uniquely identifies the digital data object; and responsive to generating the QR code, activating the digital data object for participation into a game by:

causing display of the QR code on an output device, causing scanning of the QR code, wherein scanning the QR code causes a printer to print a physical copy of the digital data object, receiving a scanned image of the physical copy of the digital data object, performing optical character recognition techniques to the scanned image comparing the scanned image of the physical copy of the digital data object to data associated with the digital data object to confirm that the physical copy of the digital data object accurately captures the data of the digital data object, based on the comparing, determining that the physical copy of the digital data object is accurate, and responsive to determining that the physical copy of the digital data object is accurate, activating the digital data object, wherein activating the digital data object is a precondition to the user being entered into a game associated with the digital data object, and notifying the user that the physical copy of the digital data object has been issued, wherein the notifying confirms to the user that the digital data object is valid and that the user has been entered into a game using the digital data object.

7. The system of claim 6, wherein the digital data object is an electronic payslip for a lottery game and wherein the physical copy of the digital data object is a printed version of the electronic payslip.

8. The system of claim 6, wherein generating the QR code associated with the digital data object comprises:

generating a uniform resource identifier that uniquely identifies the digital data object; and based on the uniform resource identifier, generating the QR code associated with the digital data object.

9. The system of claim 6, wherein the digital data object is a string comprising a plurality of static variables and a plurality of values.

10. The system of claim 6, wherein causing the scanning of the QR code comprises:

causing a remote scanning device to scan the QR code displayed on the output device.

11. A non-transitory computer readable medium comprising one or more sequences of instructions, which, when executed by one or more processors, causes a computing system to perform operations comprising:

receiving, by the computing system, a request to create a digital data object from a user device of a user, the request comprising user data for the digital data object;

generating, by the computing system, the digital data object based on one or more parameters of the user data;

generating, by the computing system, a quick response (QR) code associated with the digital data object, wherein the QR code uniquely identifies the digital data object; and responsive to generating the QR code, activating, by the computing system, the digital data object for participation into a game by:

causing, by the computing system, display of the QR code on an output device, causing, by the computing system, scanning of the QR code, wherein scanning the QR code causes a printer to print a physical copy of the digital data object, receiving, by the computing system, a scanned image of the physical copy of the digital data object, performing, by the computing system, optical character recognition techniques to the scanned image, comparing, by the computing system, the scanned image of the physical copy of the digital data object to data associated with the digital data object to confirm that the physical copy of the digital data object accurately captures the data of the digital data object, based on the comparing, determining, by the computing system, that the physical copy of the digital data object is accurate, and responsive to determining that the physical copy of the digital data object is accurate, activating, by the computing system, the digital data object, wherein activating the digital data object is a precondition to the user being entered into a game associated with the digital data object, and notifying, by the computing system, the user that the physical copy of the digital data object has been issued, wherein the notifying confirms to the user that the digital data object is valid and that the user has been entered into a game using the digital data object.

12. The non-transitory computer readable medium of claim 11, wherein the digital data object is an electronic payslip for a lottery game and wherein the physical copy of the digital data object is a printed version of the electronic payslip.

13. The non-transitory computer readable medium of claim 11, wherein generating, by the computing system, the QR code associated with the digital data object comprises:

generating a uniform resource identifier that uniquely identifies the digital data object; and based on the uniform resource identifier, generating the QR code associated with the digital data object.

14. The non-transitory computer readable medium of claim 11, wherein causing the scanning of the QR code comprises:

causing, by the computing system, a remote scanning device to scan the QR code displayed on the output device.

\* \* \* \* \*